Figure 1:
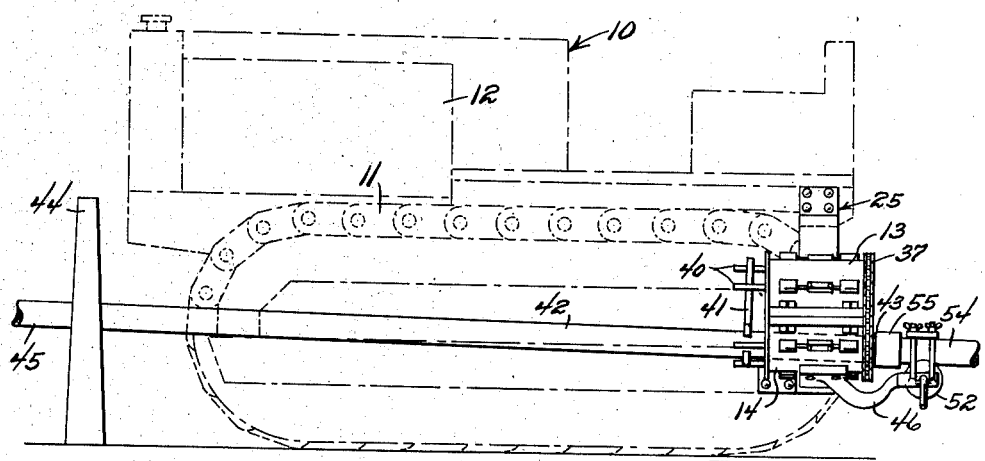

Aug. 18, 1942.                    H. H. BRANHAM                    2,293,107
                                PIPE LAYING MACHINE
                              Filed May 20, 1940          2 Sheets-Sheet 1

Henry H. Branham
INVENTOR

BY *Victor J. Evans & Co.*
ATTORNEYS

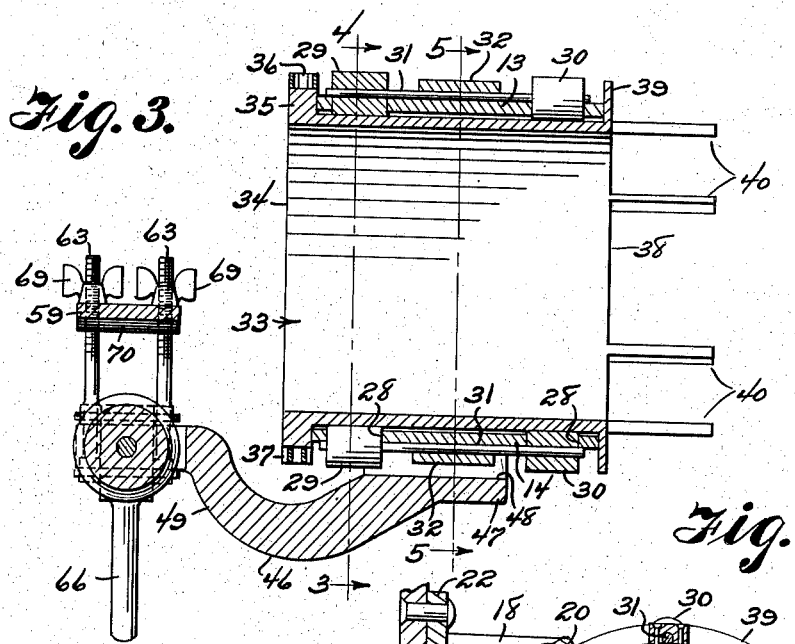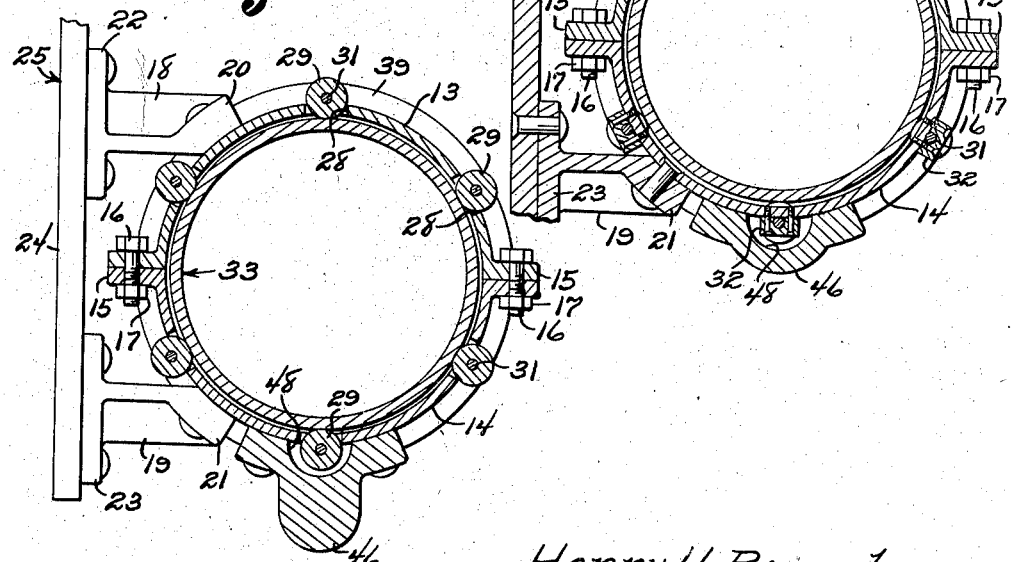

Patented Aug. 18, 1942

2,293,107

UNITED STATES PATENT OFFICE 2,293,107

PIPE LAYING MACHINE

Henry H. Branham, Freer, Tex.

Application May 20, 1940, Serial No. 336,253

2 Claims. (Cl. 29—84)

My invention relates to pipe laying and screwing devices.

An important object of my invention is to provide a pipe laying attachment for a tractor, or the like, whereby the threaded ends of pipe sections may be efficiently screwed together with ease and dispatch.

Another object of my invention is to provide a pipe laying attachment for a tractor, or the like, that is adapted to travel along the connected pipe sections during the process of joining other sections thereto, thus facilitating the laying of the pipe across rough or uneven ground.

Still another object of my invention is to provide a pipe laying attachment for a tractor, or the like, that is simple in construction, efficient in operation and inexpensive to manufacture.

Other objects and advantages of my invention will be apparent during the course of the following description.

Figure 2:
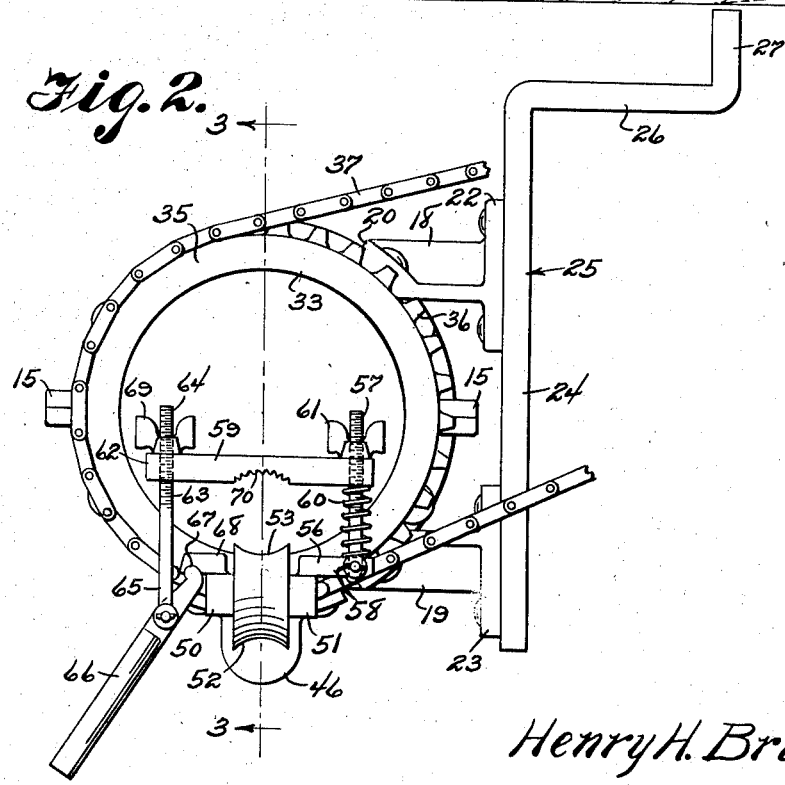

In the drawings, forming a part of this specification, and in which like numerals are employed to designate like parts throughout the same:

Figure 1 is a side elevation of my device, and showing its association with a tractor, or the like, Figure 2 is an enlarged end elevation of my device, Figure 3 is a vertical sectional view, taken on the line 3—3 of Figure 2, Figure 4 is a vertical sectional view, taken on the line 4—4 of Figure 3, and Figure 5 is a vertical sectional view, taken on the line 5—5 of Figure 3.

In the accompanying drawings, wherein for the purpose of illustration, is shown a preferred embodiment of my invention, the numeral 10 designates a tractor of the conventional type, including endless treads 11 and an engine 12 having a power take-off pulley (not shown) extending rearwardly thereof.

The semi-circular bearings 13 and 14 are provided with outwardly extending flanges 15 which are securely held together by the bolts and nuts 16 and 17. The brackets 18 and 19 have the outer ends 20 and 21 thereof riveted or otherwise secured to the bearings 13 and 14 and the inner ends 22 and 23 thereof riveted to the vertically disposed arm 24 of the supporting bracket 25. The supporting bracket 25 has the upper end 26 thereof bent inwardly, the extremity 27 of which is disposed upwardly and adapted to be bolted to the frame of the tractor 10 adjacent the rear thereof and in a manner to position the bearings 13 and 14 laterally of the body of the tractor. The peripheries of the bearings 13 and 14 are provided with spaced pairs of openings 28 positioned circumferentially therearound. The spaced rollers 29 and 30 are mounted upon the shaft 31 and positioned within the spaced openings 28 with the inner peripheries thereof extending substantially beyond the inner periphery of the bearings 13 and 14. The retaining bearing 32 receiving the shaft 31 intermediate of the rollers 29 and 30 is bolted or otherwise secured to the main bearing 13 or 14. The retaining bearing 32 permits the rotation of shaft 31 therein and consequently the rotation of the rollers 29 and 30 carried by the said shaft. A sleeve or cylinder member 33 is positioned within the bearings 13 and 14 and supported by the rollers 29 and 30 spaced circumferentially therearound. The rear edge 34 of the cylinder 33 is formed with an outwardly extending marginal flange 35, the peripheral edge of which is toothed to define a sprocket 36, and a sprocket chain 37 is trained about the sprocket 36 and a sprocket, not shown, on the power take-off shaft of the tractor to effect the rotation of the cylinder 33 within the bearings 13 and 14. The forward edge 38 of the cylinder is formed with an outwardly extending marginal flange 39 which projects beyond the edge of the bearings 13 and 14, and shanks 40 are spaced circumferentially around and integrally connected to the flange 39 for disposal forwardly therefrom. The shanks are for the purpose of receiving pipe tongs 41, in a manner so that the handle of the tongs is positioned between two adjacent shanks, for one shank to bear against the handle to rotate the tongs with the jawed end thereof in gripping engagement with the pipe section 42, with its threaded end 43 positioned within the cylinder 33, as will be apparent from Figure 1. A pipe jack 44 is placed forwardly of the tractor 10 to support the free end portion of the pipe 42.

A supporting arm 46 has the end 47 thereof riveted or otherwise secured to the bearing 14 at substantially its middle and with the roller 29 suitably spaced therefrom to permit rotation thereof within the arcuated recess 48. The outer end portion 49 of the arm 46 curves upwardly, as illustrated in Figure 3, and terminates in horizontally disposed bifurcations 50 and 51 between which is rotatably mounted a roller 52 formed with a concaved periphery 53 which is adapted to receive and support the connected pipe sections 54 the free end of which is provided with a coupling 55. The bifurcation 51 of the arm 46 has formed thereon a laterally extending support 56 which is formed with trunnions to receive the heads of the eye-bolts 57, and pin 58 extends transversely through the trunnions to hold the eye-bolts 57 pivotally associated therewith. A bar 59 is carried by the spaced eye-bolts 57, and coil springs 60 are interposed between the lower face thereof and the upper face of the support 56, and wing nuts 61 are threaded on the upwardly extending ends of the eye-bolts to engage the upper face of the bar 59, to move the same to the desired height above the roller 52 against the resilient action of the springs 60. The lower face of the bar 59 is formed with an arcuated toothed recess 70 positioned above the concaved face 53 of the roller 52 which is adapted to grip the upper face of the pipe sections 54. The end 62 of the bar 59 receives the threaded ends 64 of the adjusting screws 63, the lower ends 65 of which pivotally support a manual lever 66. The inwardly extending end 67 of the manual lever 66 is adapted to engage the laterally extending support 68 carried by the bifurcation 50. Wing nuts 69 are carried by the adjusting bolts 64 and are adapted to be threaded thereon to engage the upper face of the bar 59 and to move the same longitudinally of the bolts 64.

The operation of my device is as follows:

The free end of the pipe section 54 is supported on the concaved face 53 of the roller 52, and the thumb nuts 61 and 69 are adjusted to properly position the clamping bar 59 to engage the section 54. The inner end 67 of the manual lever 66 is then moved into engagement with the under face of the support or projection 68 which acts as a fulcrum for the lever and the latter is then lowered for disposing the teeth 70 into biting engagement with the pipe section 54 to hold the same against rotation, as will be apparent. The pipe section 42 to be connected to the coupling 55 is then mounted in the cylinder 33 and on the jack 44, after the jawed end of the tongs 41 has been applied to the section 42, thence the inner threaded end 43 is disposed in engagement with the threads of the coupling 53 and the handle of the tongs is arranged for a shank 49 to bear against the same, with the result it will be seen that upon rotation of the cylinder 33 the tongs will rotate the section 42 and thread the same into the coupling.

When the section 42 has been connected to the section 54, the latter is released, from the clamping means and the tractor is moved forwardly. A coupling is then threaded on the pipe section 42 by reversing the direction of the power take-off shaft. After the coupling has been attached, the tractor is again moved forwardly to position the latter coupling within the cylinder 33 and another section is then attached to the pipe section 42. That operation is continued until the pipe line is completed.

It is to be understood that the form of my invention, herewith shown and described, is to be taken as a preferred example of the same, and that various changes in the size, shape and arrangement of parts may be resorted to, without departing from the spirit of my invention, or the scope of the appended claims.

Having thus described my invention, I claim:

1. A pipe laying device comprising a stationary supporting bearing, a driven sleeve for receiving a pipe section therein and mounted for rotation within said bearing, spaced shanks formed on said sleeve and extending from one end thereof to bear against pipe tongs for holding the latter in gripping engagement with a pipe section positioned within the sleeve, an arm carried by said bearing and extending axially therefrom to underlie the free end of a pipe line to which the said pipe section is to be coupled by said tongs upon rotation of the sleeve, a roller carried by the arm for rotation about an axis transverse to the axis of the sleeve, said roller adapted to support the pipe line and to ride along the same as successive sections are added thereto, and pipe engaging means carried by the arm for holding the pipe line clamped against the roller during the coupling of said pipe section thereto.

2. A pipe laying device comprising a stationary supporting bearing, a driven sleeve for receiving a pipe section therein and mounted for rotation within said bearing, spaced shanks formed on the sleeve and extending from one end thereof to bear against pipe tongs for holding the same in gripping engagement with a pipe section positioned within the sleeve, an arm carried by said bearing and extending axially therefrom to underlie the free end of a pipe line to which said pipe section is to be coupled by the tongs upon rotation of the sleeve, a roller carried by the arm for rotation about an axis transverse to the axis of the sleeve, said roller adapted to support the pipe line and to ride along the same as successive sections are added thereto, and pipe engaging means carried by the arm for holding the pipe line clamped against the roller during the coupling of said pipe section thereto, and said pipe engaging means comprising upstanding threaded bolts pivotally mounted on the arm, a clamping bar arranged above said roller and having one end slidably mounted on the bolts for movement relative to the roller, means threaded on the bolts and engageable with the bar to move the same against the pipe line, bolt elements carried by the opposite end of the bar, a projection formed on the arm, and a manually actuated lever pivoted to said bolt elements and having one end arranged to engage said projection to lock the bar in clamping engagement with the pipe line.

HENRY H. BRANHAM.